Patented Apr. 27, 1937

2,078,230

UNITED STATES PATENT OFFICE 2,078,230

PROCESS FOR HYDROGENATING SUBSTITUTED AROMATIC ALCOHOLS

Euclid W. Bousquet, Wilmington, and Wilbur A. Lazier, Marshallton, Del., assignors to E. I. du Pont de Nemours & Company, Wilmington, Del., a corporation of Delaware No Drawing. Application June 2, 1934, Serial No. 728,672

14 Claims. (Cl. 260—108)

This invention relates to catalytic hydrogenation processes and more particularly to catalytic processes for the hydrogenation of ring-substituted aromatic alcohols to the corresponding ring-substituted aromatic hydrocarbons. More particularly it relates to a catalytic process for the hydrogenation of benzyl alcohols, in which the aromatic ring may carry other side chains or groups, to the corresponding substituted toluenes.

It is known that benzyl alcohol may be catalytically reduced to give toluene as the principal product. The present invention is concerned with the more difficult problem of selectively substituting an atom of hydrogen for a hydroxyl radical in an aromatic carbinol group when other groups such as hydroxyls or carboxyls are attached to the aromatic ring or are present in side chains attached to the aromatic ring.

This invention has as an object the provision of a process for the catalytic hydrogenation of ring-substituted aromatic alcohols. A still further object is the provision of a process whereby carboxy-substituted aromatic alcohols may be converted to the corresponding carboxy-substituted aromatic hydrocarbons.

It is a specific object of the invention to provide a novel and economical process for the preparation of ortho toluic acid. Further objects will appear hereinafter.

These objects are accomplished by the following invention wherein a substituted aromatic alcohol is brought in contact with hydrogen in the presence of a hydrogenating catalyst under suitable conditions of temperature and pressure.

The following examples illustrate in greater detail the practice of the process of the present invention.

Example I

Three hundred grams of phthalide, containing not more than 5% of ortho-toluic acid as an impurity, was saponified with 88 gms. of sodium hydroxide and enough water to make 550 cc. of a solution of sodium ortho-hydroxymethyl benzoate. 275 cc. of this solution and 20 gms. of elementary nickel catalyst supported on kieselguhr, were charged into a shaking autoclave. Hydrogen was admitted until the pressure was 2000 lbs., per square inch, after which the autoclave was heated to 110° C. and agitated for seven hours.

The products of hydrogenation were treated with dilute sulphuric acid to convert to ortho-toluic acid the sodium ortho-toluate formed by the hydrogenation. Fractional distillation of the acidified solution gave an 80% yield of ortho-toluic acid with a melting point of 93°-99° C. Upon recrystallization from hot water a melting point of 102½°-103½° C. was obtained.

The process was repeated exactly as outlined above except that after hydrogen absorption had become complete at the temperature range 110–120° C., the temperature was raised to 180° C. Hydrogenation proceeded once more, this time with the production of hexahydro ortho-toluic acid which was isolated in 75% yields.

Example II

Fifty grams of alpha phenyl phthalide was saponified with the theoretical amount of potassium hydroxide. The solution was carefully neutralized and made up to a volume of 200 cc. Ten grams of a freshly reduced nickel-on-kieselguhr catalyst was added and the mixture was agitated for one hour at a temperature of 100–120° C. and under a hydrogen pressure of 1,200 lbs. per square inch. Hydrogen absorption was rapid and complete and resulted in the nearly quantitative production of ortho benzylbenzoic acid which was isolated from the salt by acidification and recrystallization.

In a similar manner alpha (p-hydroxyphenyl) phthalide was saponified and the aqueous solution of the salt hydrogenated to ortho (p-hydroxybenzyl) benzoic acid.

The invention is applicable to compounds of the type

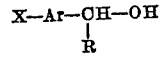

where R represents a hydrogen atom or an alkyl or aryl radical, and Ar represents a mono- or polynuclear aromatic nucleus. X may be any one of a variety of groups including carboxyl (COOH) and salts, esters and amides thereof; the point of attachment of an adjoining ring, or an aliphatic side chain containing one of the aforementioned radicals. Certain compounds included in the above described group form lactones, such as phthalide from hydroxymethylbenzoic acid and naphthalide from the corresponding hydroxymethylnaphthoic acid. In such cases the appropriate derivative required for use in hydrogenation may be formed by saponification with alkali metal hydroxides by the usual methods. In fact, in the preferred embodiment of the invention, the carboxyl groups present in the hydroxymethylbenzoic acids are saponified with an alkali metal hydroxide and the salt thus formed is then catalytically hydrogenated in aqueous solution. This saponification is not only desirable but necessary when lactones are to be hydrogenated since the lactone ring must be opened to form the hydroxyl group which is to be reduced. It is, of course, obvious that the product of the catalytic hydrogenation of the alkali metal derivative must be acidified in order to obtain the free acid, where the substituted acid is sought.

In the examples certain definite conditions of operation have been indicated but these may be varied somewhat within the scope of the present invention. The preferred temperature is above 30° C., best results being obtained at 60 to 150° C. Above 150° C. varying amounts of hydrogenated aromatic compounds wherein the ring has been hydrogenated are obtained. Thus, at 200° C. little or no toluic acid is obtained from saponified phthalide, hexahydrotoluic acid being formed instead. A prolonged hydrogenation at temperatures of 150° C. or even lower results in the formation of some ring hydrogenated compounds. Pressures of 150 lbs. per square inch and above may be employed but the preferred pressure is usually between 500 and 3,000 lbs. per square inch. The invention is not limited to these pressures since the pressure may be varied depending on the compound hydrogenated. In many cases the temperatures and pressures employed are determined by the activity of the hydrogenating catalyst.

Although in the examples catalysts of only one composition are disclosed, the invention is not necessarily limited to the use of a catalyst of this specific composition. In carrying out the hydrogenation other well known hydrogenating catalysts such as nickel, cobalt, iron, copper, platinum, paladium, and silver may be used. These metals may be used as catalysts in their metallic form or in the form of their oxides, hydroxides, chromites, chromates, and the like. They are preferably used in conjunction with an inert support such as kieselguhr, pumice, active carbon, silica gel and the like. Finely divided metallic nickel is the preferred catalyst and may be prepared in an active condition by a number of methods. The preferred method consists in the reduction with hydrogen of such oxygen-containing nickel compounds as the oxide, hydroxide, or salt of an inorganic acid such as chromic acid. Temperatures suitable for the reduction of nickel-containing compounds lie within the range 350 to 500° C. Ammonia and other reducing gases than hydrogen may be used to reduce the nickel compounds to a metallic state. When reducing nickel chromate with hydrogen the chromium oxide formed from the chromate serves as a supporting body for the nickel.

The batch or static method of operation is preferred but the process may also be operated continuously. In general, in batch processes the compound undergoing hydrogenation is in the liquid phase, whereas, in the continuous mode of operation the compound being hydrogenated may be in the liquid and/or vapor phase. In general, an excess of hydrogen is used and may vary even as high as a 1,000% excess. The rate of passage of the compound over the catalyst in the continuous process varies according to the capacity of the catalyst, the temperature, and the pressure. Ordinarily the rate will vary from 2 to 8 volumes of liquid per hour per unit of volume of catalyst, but higher rates may be employed at the expense of slightly lower rates of conversion.

By means of the above described invention, it is now possible to synthesize various substituted aromatic hydrocarbons and particularly toluic acids. These syntheses are accomplished more readily and economically than by former methods and thus render available to the arts and industries a number of valuable products at a decreased cost.

As many apparently widely different embodiments of this invention may be made without departing from the spirit and scope thereof, it is to be understood that we do not limit ourselves to the specific embodiments thereof except as defined in the appended claims.

We claim:

1. Process for the production of substituted aromatic hydrocarbons of the formula

from aromatic alcohols of the formula

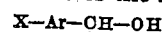

wherein "R" is a member of the group consisting of hydrogen and aryl radicals, "Ar" is an aromatic hydrocarbon radical, and "X" is at least one substituent from the class consisting of carboxyl and salts, esters, and amides thereof, which comprises bringing said alcohol into contact with hydrogen in the presence of a hydrogenating catalyst at a temperature of 30° to 150° C. and a pressure of at least 150 pounds per square inch.

2. Process for the production of substituted aromatic hydrocarbons of the formula X—Ar—CH₃ from aromatic alcohols of the formula

X—Ar—CH₂—OH wherein Ar is an aromatic hydrocarbon radical and X is at least one substituent from the class consisting of carboxyl and salts, esters and amides thereof, which comprises bringing said alcohol into contact with hydrogen in the presence of a hydrogenating catalyst at a temperature of 30 to 150° C. and a pressure of at least 150 lbs. per square inch.

3. Process for the production of substituted aromatic hydrocarbons of the formula: X—Ar—CH₃ from aromatic alcohols of the formula

wherein Ar is an aromatic hydrocarbon radical and X is at least one substituent from the class consisting of carboxyl and salts, esters and amides thereof, which comprises bringing said alcohol into contact with hydrogen in the presence of a hydrogenating catalyst at a temperature of 30 to 150° C. and a pressure of 500 to 3,000 lbs. per square inch.

4. Process for the production of substituted aromatic hydrocarbons of the formula: X—Ar—CH₃ from aromatic alcohols of the formula

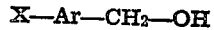

wherein Ar is an aromatic hydrocarbon radical and X is at least one substituent from the class consisting of carboxyl and salts, esters and amides thereof, which comprises bringing said alcohol into contact with hydrogen in the presence of a hydrogenating catalyst at a temperature of 60 to 150° C. and a pressure of 500 to 3,000 lbs. per square inch.

5. Process for the production of substituted aromatic hydrocarbons of the formula: X—Ar—CH₃ from aromatic alcohols of the formula X—Ar—CH₂—OH wherein Ar is an aromatic hydrocarbon radical and X is at least one substituent from the class consisting of carboxyl and salts, esters and amides thereof, which comprises bringing said alcohol into contact with hydrogen in the presence of a nickel catalyst at a temperature of 60 to 150° C. and a pressure of 500 to 3,000 lbs. per square inch.

6. Process for the preparation of alkyl-substituted aromatic acids, from hydroxyalkyl-substituted aromatic acids, which comprises bringing the hydroxyalkyl-substituted aromatic acid in contact with hydrogen in the presence of a hydrogenating catalyst at a temperature of 30 to 150° C. and a pressure of at least 150 lbs. per square inch.

7. Process for the preparation of alkyl-substituted aromatic acids, from hydroxyalkyl-substituted aromatic acids, which comprises bringing the hydroxyalkyl-substituted aromatic acid in contact with hydrogen in the presence of a hydrogenating catalyst at a temperature of 30 to 150° C. and a pressure of 500 to 3,000 lbs. per square inch.

8. Process for the preparation of alkyl-substituted aromatic acids, from hydroxyalkyl-substituted aromatic acids, which comprises bringing the hydroxyalkyl-substituted aromatic acid in contact with hydrogen in the presence of a hydrogenating catalyst at a temperature of 60 to 150° C. and a pressure of 500 to 3,000 lbs. per square inch.

9. Process for the preparation of alkyl-substituted aromatic acids, from hydroxyalkyl-substituted aromatic acids, which comprises bringing the hydroxyalkyl-substituted aromatic acid in contact with hydrogen in the presence of a nickel catalyst at a temperature of 60 to 150° C. and a pressure of 500 to 3,000 lbs. per square inch.

10. Process for the production of toluic acid from a hydroxymethylbenzoic acid which comprises bringing a hydroxymethylbenzoic acid in contact with hydrogen in the presence of a nickel catalyst at a temperature of 60 to 150° C. and a pressure of 500 to 3,000 lbs. per square inch.

11. Process for the preparation of orthotoluic acid which comprises bringing a solution of sodium orthohydroxymethylbenzoate in contact with hydrogen at a pressure of approximately 3,000 lbs. per square inch and a temperature of approximately 110° C. in contact with a nickel catalyst, and isolating the orthotoluic acid from the products of the hydrogenation.

12. Process for the production of alkyl-substituted aromatic acids from hydroxyalkyl-substituted aromatic acids, which comprises bringing the hydroxyalkyl-substituted aromatic acid in contact with hydrogen in the presence of a hydrogenating catalyst at a temperature of 30° to 150° C.

13. Process for the production of alkyl-substituted aromatic acids from hydroxyalkyl-substituted aromatic acids, which comprises bringing the hydroxyalkyl-substituted aromatic acid in contact with hydrogen in the presence of a hydrogenating catalyst at a temperature of 60° to 150° C.

14. Process for the production of alkyl-substituted aromatic acids from hydroxyalkyl-substituted aromatic acids, which comprises bringing the hydroxyalkyl-substituted aromatic acid in contact with hydrogen in the presence of a nickel catalyst and at a temperature of 30° to 150° C.

EUCLID W. BOUSQUET.
WILBUR A. LAZIER.